United States Patent

Nonami

Patent Number: 6,112,290
Date of Patent: Aug. 29, 2000

[54] COMMUNICATION SYSTEM SIGNAL PROCESSING APPARATUS WITH ROM STORED SIGNAL PROCEDURES EXECUTED RAM

[75] Inventor: Takayuki Nonami, Hyogo-ken, Japan

[73] Assignee: Mitsubishi Denki Kabushiki Kaisha, Tokyo, Japan

[21] Appl. No.: 08/465,315

[22] Filed: Jun. 5, 1995

Related U.S. Application Data

[63] Continuation of application No. 08/272,635, Jul. 11, 1994, abandoned, which is a continuation of application No. 07/774,865, Oct. 11, 1991, abandoned.

[30] Foreign Application Priority Data

Feb. 8, 1991 [JP] Japan .................................. 3-037861

[51] Int. Cl.⁷ .................................................. G06F 13/00
[52] U.S. Cl. ............................................. 712/35; 712/220
[58] Field of Search .................................. 395/328, 800; 140/711; 379/58, 59; 712/220, 35, 32, 200

[56] References Cited

U.S. PATENT DOCUMENTS

| | | | |
|---|---|---|---|
| 4,439,837 | 3/1984 | Aiena et al. | 395/275 |
| 4,649,505 | 3/1987 | Zinser, Jr. et al. | 379/411 |
| 4,903,262 | 2/1990 | Dissosway et al. | 370/95.2 |
| 4,918,690 | 4/1990 | Markkula et al. | 370/94 |
| 4,972,504 | 11/1990 | Daniel et al. | 455/2 |
| 5,109,521 | 4/1992 | Culley | 395/800 |
| 5,148,153 | 9/1992 | Haymond | 340/711 |
| 5,179,734 | 1/1993 | Candy et al. | 395/800 |
| 5,202,829 | 4/1993 | Geier | 364/449 |
| 5,226,168 | 7/1993 | Kobayashi et al. | 395/800 |
| 5,261,110 | 11/1993 | Mitsuishi et al. | 395/800 |
| 5,295,178 | 3/1994 | Nickel et al. | 379/58 |
| 5,313,605 | 5/1994 | Huck et al. | 395/425 |
| 5,379,388 | 1/1995 | Asghar | 395/375 |

FOREIGN PATENT DOCUMENTS 2227584  1/1990  United Kingdom  ............ G06F 12/12

OTHER PUBLICATIONS

Number smasher version 3.0, Technical manual, Micro Way Inc publication, pp. 1–23, (1985).

*Primary Examiner*—Zarni Maung
*Attorney, Agent, or Firm*—Rothwell, Figg, Ernst & Manbeck

[57] ABSTRACT

A signal processing apparatus is disclosed which includes a low speed ROM (9) for storing a plurality of signal procedures, a high speed RAM (4) used by a digital signal processor DSP (5), a control processor CPU (8) for transferring a signal procedures from the low speed ROM (9) to the high speed RAM (4), a digital signal processor DSP (5) for processing the signal procedures loaded in the high speed RAM (4). Accordingly, a signal processing apparatus of the present invention is constructed with low cost memory, then reduces manufacturing cost of the apparatus.

7 Claims, 3 Drawing Sheets

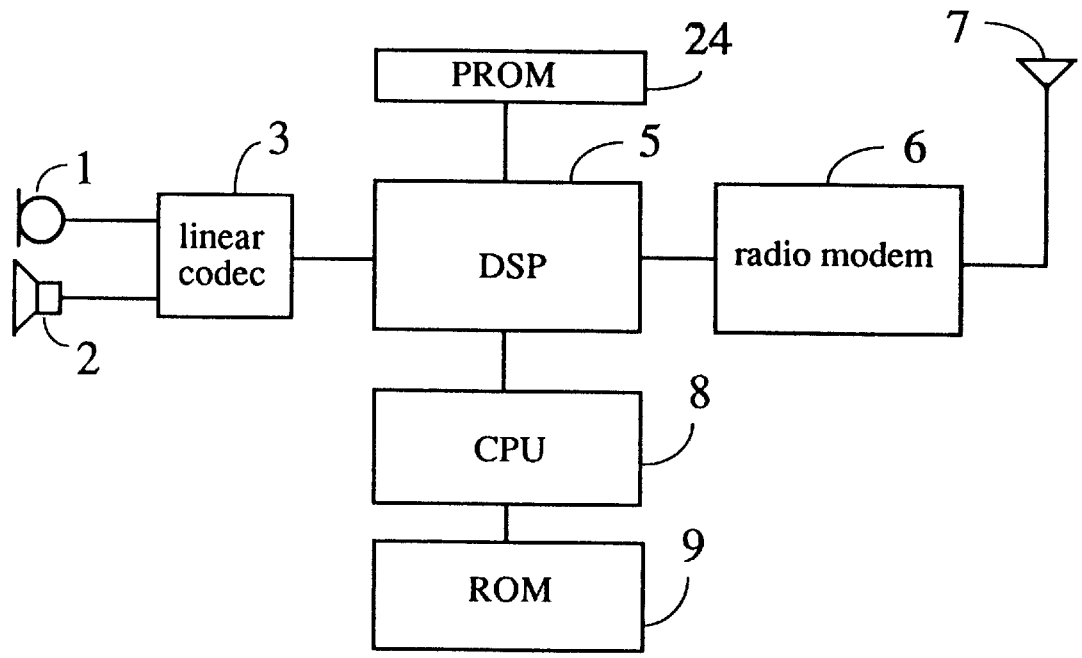
FIG. 4    (PRIOR ART)
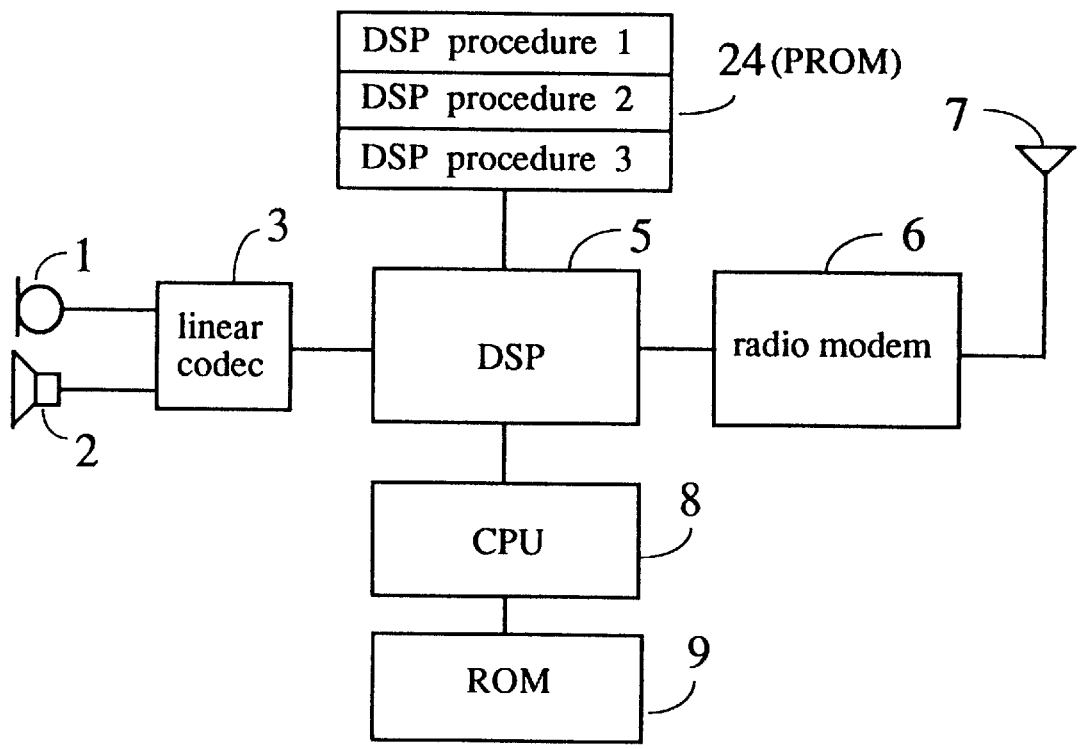
FIG. 5    (PRIOR ART)

US 6,112,290

COMMUNICATION SYSTEM SIGNAL PROCESSING APPARATUS WITH ROM STORED SIGNAL PROCEDURES EXECUTED RAM

This is a continuation of application Ser. No. 08/272,635, filed Jul. 11, 1994, now abandoned which in turn is a continuation of application Ser. No. 07/774,865, filed Oct. 11, 1991, now abandoned.

BACKGROUND OF THE INVENTION

1. Field of the Invention

The invention relates to a signal processing apparatus which is applicable to a radio communication apparatus.

2. Description of the Prior Art

FIG. 4 shows a block diagram of a conventional signal processing apparatus as applied to a radio communication system. In FIG. 4, an analog output voice signal from a microphone 1 is converted to a digital signal in a linear codec 3. A digital signal processor ( DSP ) 5 executes a coding process, a data compression process and an error correction process according to the instruction stored in a high speed PROM 24 and outputs coded data to a radio modem 6. The radio modem 6 modulates the coding data received from DSP 5 according to the instruction from a control processor 8 which controls the devices in the signal processing apparatus and transmits the modulated radio signal to the base station ( not shown) via an antenna 7.

In the case of receiving the radio signal from the base station, the radio signal is input to the radio modem 6 via the antenna 7. The radio modem 6 demodulates the modulated signal and sends it to the DSP 5 . The DSP 5 decodes the coded signal according to the instruction procedure stored in the high speed PROM 24 and sends the decoded digital signal to the linear codec 3. The linear codec 3 converts the digital signal to an analog signal and sends the analog signal to a speaker 2.

FIG. 5 shows a block diagram of a second conventional signal processing apparatus which is also applied to radio communication systems. FIG. 5 is different from the FIG. 4 in that the high speed PROM 24 in FIG. 5 includes a plurality of different kinds of procedures. The DSP 5 selects one of the procedures stored in the high speed PROM 24 and controls the processes according to the selected procedure. In FIG. 5, the operation of the signal processing apparatus is otherwise the same as that of the FIG. 4. Therefore further detailed description is omitted.

As discussed above, this apparatus is designed so that the DSP 5 processes a plurality of procedures stored in the PROM 24. Since the DSP 5 operates at a high speed, the PROM 24 must also be operated at a high speed. But, the cost of the PROM 24 is very expensive because it must operate at very high speed. If the PROM 24 includes many procedures which are processed in the DSP 5, the cost will increase further.

Therefore, it is a primary object of the present invention to provide a signal processing apparatus in which a plurality of signal procedures are stored in a low cost and low speed ROM.

It is further object of the present invention to provide a signal processing apparatus in which a control processor CPU loads a plurality of signal procedures from the low speed ROM to the high speed RAM, and a digital signal processor DSP processes the signal procedures loaded in the high speed RAM.

It is still further object of the invention to provides a signal processing apparatus using a low cost memory.

SUMMARY OF THE INVENTION

A signal processing apparatus according to the present invention includes a low speed ROM for storing a plurality of signal procedures, a high speed RAM used by a digital signal processor, a control processor CPU for transferring a signal procedures from the low speed ROM to the high speed RAM and a digital signal processor DSP for processing the signal procedures loaded in the high speed RAM.

BRIEF DESCRIPTION OF THE DRAWING

FIG. 4 is a block diagram of a first conventional signal processing apparatus.

FIG. 5 is a block diagram of a second conventional signal processing apparatus.

DETAILED DESCRIPTION OF THE PREFERRED EMBODIMENTS

Figure 1:
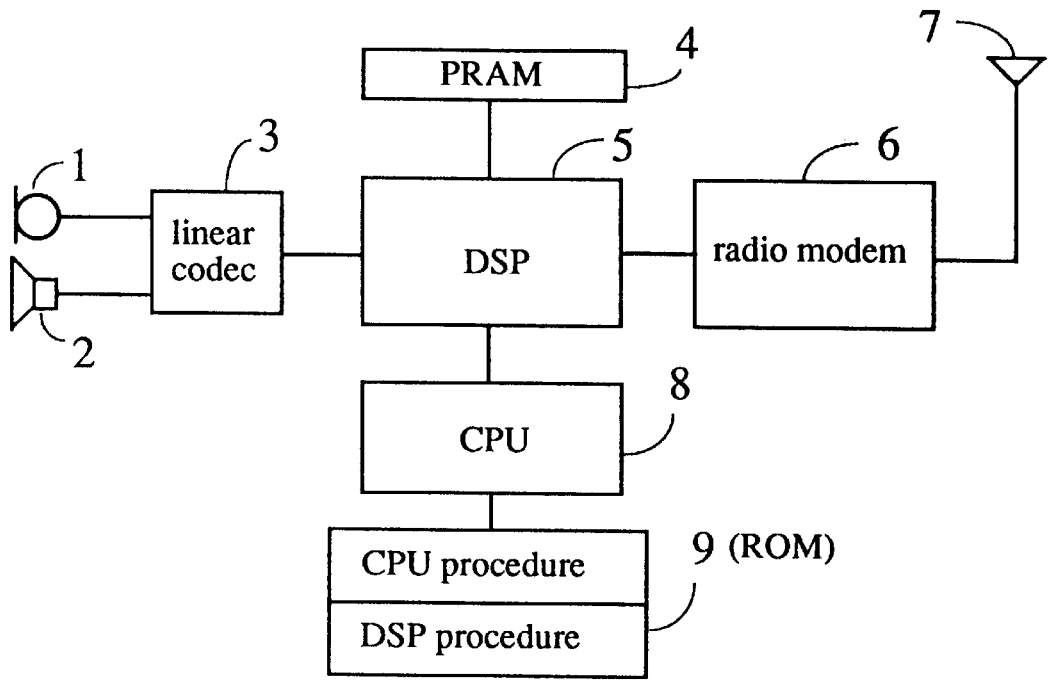
FIG. 1 is a block diagram of a first embodiment of a signal processing apparatus of the present invention.

The operation of the first embodiment is explained hereinafter with reference to FIG. 1 . An analog output voice signal from the microphone 1 is converted to a digital signal in a linear codec 3. A digital signal processor ( DSP ) 5 executes a number of different kinds of signal processes according to the instruction procedures stored in a programmable random access memory ( PRAM ) 4 and outputs the coded signal to a radio modem 6. The radio modem 6 modulates the coded data received from DSP 5 and transmits the modulated radio signal to the base station ( not shown ) via the antenna 7 .

The received radio signal is input to the radio modem 6 via the antenna 7. The radio modem 6 demodulates the radio signal to derive the demodulated digital signal. The DSP 5 executes different kinds of signal processes according to the instruction procedures stored in PRAM 4 and outputs the decoded signal to the linear codec 3 . The linear codec 3 converts the digital signal to an analog signal and sends it to the speaker 2. The speaker 2 converts the analog signal to voice output.

In FIG. 1, high speed PRAM 4 is a programmable random access memory which is used for DSP 5. A low speed ROM 9 stores a plurality of instruction procedures used in DSP 5 as well as the instruction procedures used in a control processor CPU 8. Control processor CPU 8 transfers the instruction procedures from the low speed ROM 9 to the high speed PRAM 4 through DSP 5. The digital signal processor DSP 5 executes the instruction procedures stored in the high speed PRAM 4 which has been transferred from the ROM 9. In FIG. 1, the same reference number as used in the FIG. 4 refers to the same component or the corresponding component. Accordingly the detailed explanation of such components is omitted in connection with those having the same number.

In the usual operation of the digital signal processor DSP 5, each procedure is not processed at the same time but one of the procedures is selected from a plurality of the procedures. Then the digital signal processor DSP 5 executes the selected one of the procedures. Therefore, in the present invention, instead of storing the procedures in the high speed PROM 24 as shown in the conventional art of FIG. 5, the procedures are stored in the low speed ROM 9. The procedures loaded from the ROM 9 into the high speed PRAM 4 when needed by the CPU 8 using interprocessor communication between the CPU 8 and the digital signal processor DSP 5. The CPU 8 lets the digital signal processor DSP 5 start after verifying the complete loading of the procedures into the high speed PRAM 4 from the ROM 9.

In the above embodiment, the signal procedures are independent from other signal procedures. In this case, the procedure for processing the signal must be substituted entirely if another signal procedure is selected. Therefore it is necessary to transfer a large amounts of data from the ROM 9 to PRAM 4. If there are some common procedures in the plurality of the signal procedures, the common procedures can be used without being substituted between the plurality of the signal procedures.

In the above embodiment, PRAM 4 is provided external to the DSP 5, but can be incorporated within DSP 5, if DSP 5 has its own internal RAM. In this case the circuit configuration can be further simplified.

In the above embodiment, voice coding procedures are described, but the present invention may be also applied to data transmission, facsimile transmission and other applications which does not use voice signals. In this case, the applicable data procedures are also stored in the ROM 9.

Figure 2:
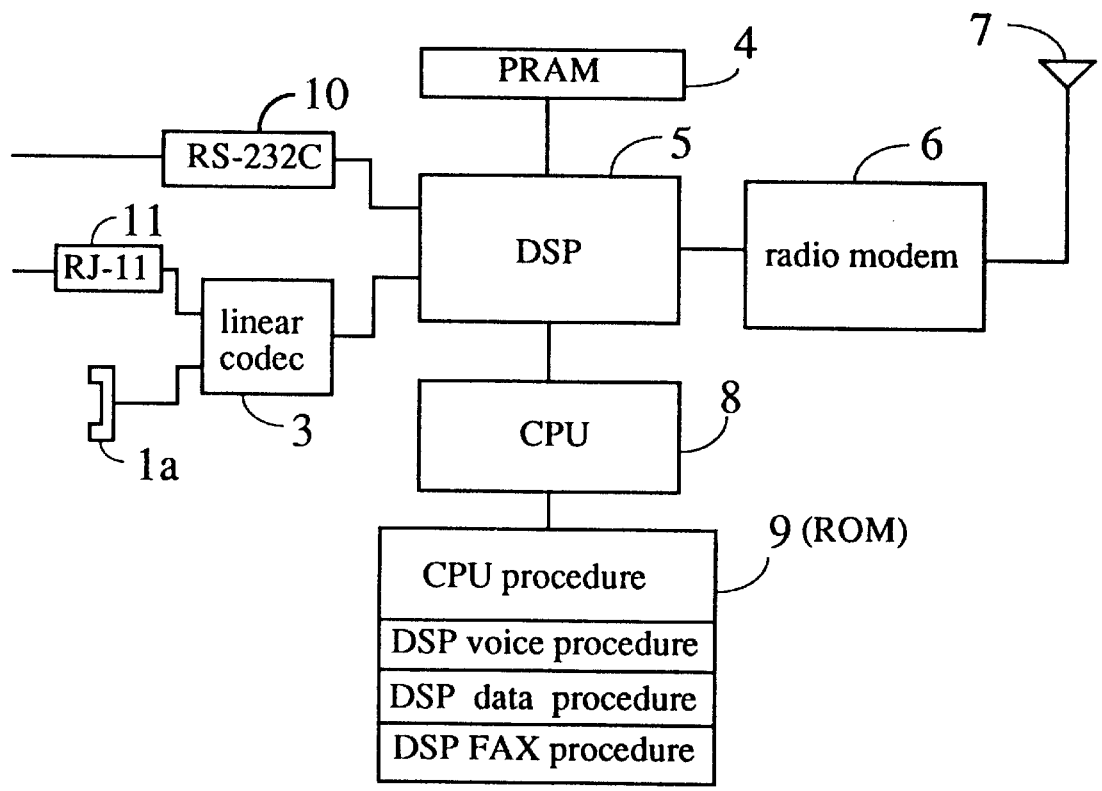
FIG. 2 is a block diagram of a second embodiment of a signal processing apparatus of the present invention.

FIG. 2 is a block diagram of a second embodiment of a signal processing apparatus of the present invention. In FIG. 2, an analog signal is input to or output from a handset la which includes a microphone and speaker. A digital signal is input through a digital interface circuit 10. The digital interface circuit 10, such as an RS-232 interface, is connected to external digital devices, such as a personal computer. An analog signal such as facsimile signal is input from an analog interface 11 such as RJ-11. In the low speed ROM 9, data transmission procedure and facsimile procedure are stored as well as voice processing procedure. A linear codec 3 converts the analog signal to a digital signal and the digital signal to an analog signal. The DSP 5 executes different kinds of signal procedures including analog procedures and digital procedures according to the signal procedures stored in the high speed PRAM 4 which are transferred from the low speed ROM 9 by the CPU 8 using interprocessor communication.

In the above embodiment, the DSP 5 processes the base band signal and may also perform part of the functions of the radio modem 6.

Figure 3:
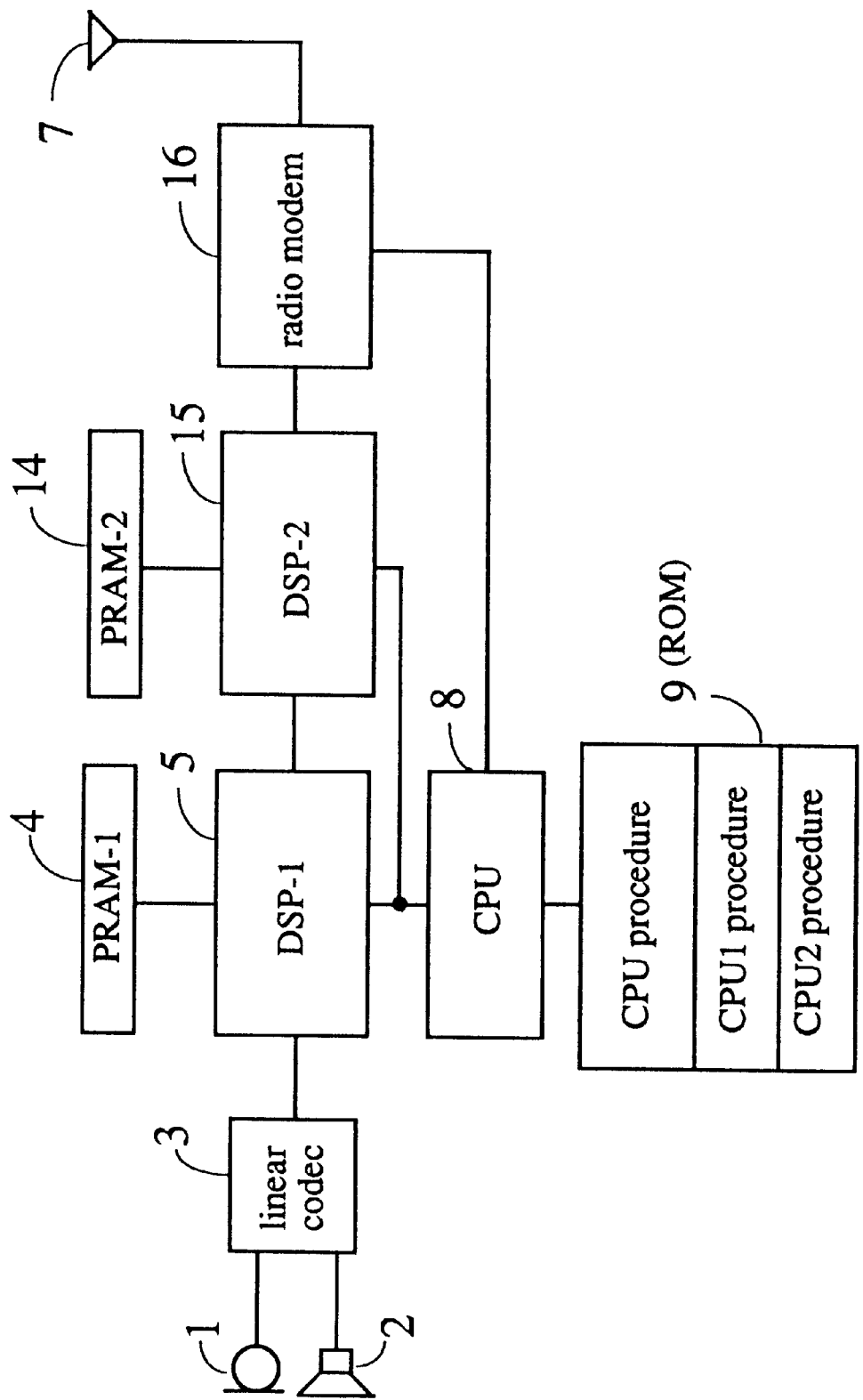
FIG. 3 is a block diagram of a third embodiment of a signal processing apparatus of the present invention.

FIG. 3 is a block diagram of a third embodiment of a signal processing apparatus of the present invention. In this embodiment, the DSP is divided into two portions a DSP-1 indicated by number 5 and a DSP-2 indicated by number 15. The DSP-1 operates to process the base band signal. The DSP-2 operates to process the modem signal. The PRAM is also divided into two portions PRAM-1 indicated by number 4 and PRAM-2 indicated by number 14. The CPU 8 transfers the baseband procedure from the low speed ROM 9 to the high speed PRAM-1, and the DSP-1 processes the baseband procedure using procedure stored in the PRAM-1. The CPU 8 also transfers stored modem procedures from the low speed ROM 9 to the high speed PRAM-2, and the DSP-2 processes the modem procedure using the procedure stored in the PRAM-2.

What is claimed is:

1. A signal processing apparatus for processing digital communication signals according to selected procedures from among a plurality of stored signal processing procedures comprising:

a digital signal processor for executing signal processing of said digital communication signals according to selected procedures from among a plurality of signal procedures;

a random access memory (RAM) for storing a plurality of signal procedures for use in controlling the operation of said digital signal processor (DSP) for the processing of signals according to selected procedures from among said signal procedures stored in said RAM;

a read only memory (ROM) for storing the plurality of signal procedures which are to be transferred to said RAM for use in processing said digital communication signals in said digital signal processor and for use in controlling operations of a control processor (CPU); and a control processor connected in interprocessor communication with said digital signal processor for reading from said ROM said plurality of stored signal procedures, including said stored signal procedures for use in controlling operations of said control processor, and for controlling said ROM and said RAM and all devices in the signal processing apparatus, and for transferring the signal procedures from the ROM to the RAM and enabling the operation of said digital signal processor according to the signal procedures transferred from said ROM and stored in said RAM.

2. The signal processing apparatus for processing digital signal of claim 1, further comprising:

a linear codec which is connected at the input of the DSP and converts an input analog signal to the digital signal or the digital signal to an output analog signal.

3. The signal processing apparatus for processing digital signal of claim 2, further comprising:

a modem which is connected at the output of the DSP and modulates the output signal of the DSP or demodulates the input signal to the DSP.

4. The signal processing apparatus for processing digital signal of claim 2, further comprising:

a digital interface which is connected at the input of the DSP and interfaces an input signal to provide a further input signal to the DSP.

5. The signal processing apparatus for processing digital signal of claim 4, further comprising:

a modem which is connected at the output of the DSP and modulates the output signal of the DSP or demodulates the input signal to the DSP.

6. The signal processing apparatus for processing digital signal of claim 2, further comprising:

a analog interface which is connected at the input of the linear codec and interfaces the an input signal an and inside signal.

7. The signal processing apparatus for processing digital signal of claim 6, further comprising:

a modem which is connected at the output of the DSP and modulates the output signal of the DSP or demodulates the input signal to the DSP.

* * * * *

UNITED STATES PATENT AND TRADEMARK OFFICE
CERTIFICATE OF CORRECTION

Page 1 of 1

PATENT NO. : 6,112,290
DATED : August 29, 2000
INVENTOR(S) : Nonami

It is certified that error appears in the above-identified patent and that said Letters Patent is hereby corrected as shown below:

<u>Column 4, claim 2,</u>
Lines 35 ans 36, delete "the" (both occurrences) and insert -- a --;

<u>Column 4, claim 6,</u>
Line 55, after "signal", the words "an and" should read -- and an --.

Signed and Sealed this

Twenty-third Day of October, 2001

Attest:

NICHOLAS P. GODICI
*Attesting Officer*    *Acting Director of the United States Patent and Trademark Office*